(12) United States Patent
Adamson et al.

(10) Patent No.: US 7,779,050 B2
(45) Date of Patent: Aug. 17, 2010

(54) METHOD, APPARATUS, AND SYSTEM FOR DATA MODELING AND PROCESSING

(75) Inventors: Dan Adamson, San Francisco, CA (US); Leo Shih, Palo Alto, CA (US); Alain T. Rappaport, San Mateo, CA (US)

(73) Assignee: Microsoft Corporation, Redmond, WA (US)

( * ) Notice: Subject to any disclaimer, the term of this patent is extended or adjusted under 35 U.S.C. 154(b) by 593 days.

(21) Appl. No.: 11/398,505

(22) Filed: Apr. 5, 2006

(65) Prior Publication Data

US 2007/0073762 A1    Mar. 29, 2007

Related U.S. Application Data

(63) Continuation of application No. 10/379,764, filed on Mar. 4, 2003, now abandoned.

(60) Provisional application No. 60/361,746, filed on Mar. 4, 2002.

(51) Int. Cl.
G06F 17/30    (2006.01)
(52) U.S. Cl. .......................... 707/809; 707/810; 707/811
(58) Field of Classification Search .................. None
See application file for complete search history.

(56) References Cited

U.S. PATENT DOCUMENTS

| | | | |
|---|---|---|---|
| 5,664,207 A | 9/1997 | Crumpler et al. | |
| 5,687,717 A | 11/1997 | Halpern et al. | |
| 5,732,074 A | 3/1998 | Spaur et al. | |
| 5,768,578 A | 6/1998 | Kirk et al. | |
| 5,772,585 A | 6/1998 | Lavin et al. | |
| 5,794,208 A | 8/1998 | Goltra | |
| 5,812,984 A | 9/1998 | Goltra | |
| 5,903,889 A | 5/1999 | de la Huerga et al. | |
| 5,924,074 A | 7/1999 | Evans | |
| 5,953,704 A | 9/1999 | McIlroy et al. | |
| 5,970,463 A | 10/1999 | Cave et al. | |
| 5,991,730 A | 11/1999 | Lubin et al. | |
| 6,049,794 A | 4/2000 | Jacobs et al. | |
| 6,049,819 A | 4/2000 | Buckle et al. | |
| 6,112,212 A * | 8/2000 | Heitler | 715/206 |
| 6,266,668 B1 | 7/2001 | Vanderveldt et al. | |
| 6,295,535 B1 | 9/2001 | Radcliffe et al. | |
| 6,311,194 B1 | 10/2001 | Sheth et al. | |
| 6,314,555 B1 | 11/2001 | Ndumu et al. | |
| 6,370,527 B1 | 4/2002 | Singhal | |
| 6,438,533 B1 | 8/2002 | Spackman et al. | |

(Continued)

FOREIGN PATENT DOCUMENTS

EP    1 158 423 A2    11/2001

OTHER PUBLICATIONS

PCT Search Report, PCT/US03/06738, Jun. 24, 2003; 6 pages.

(Continued)

*Primary Examiner*—Baoquoc N To
(74) *Attorney, Agent, or Firm*—Turocy & Watson LLP

(57) ABSTRACT

A method and system to process a domain. A domain is modeled with one or more domain models. Support models are generated from domain models. An ontological system utilizes the support models to interact with and manipulate the domain models. Further, the support models are used to describe domain model states.

19 Claims, 14 Drawing Sheets

U.S. PATENT DOCUMENTS

| | | | |
|---|---|---|---|
| 6,519,617 B1* | 2/2003 | Wanderski et al. | 715/235 |
| 6,938,204 B1* | 8/2005 | Hind et al. | 715/234 |
| 6,990,653 B1* | 1/2006 | Burd et al. | 717/108 |
| 7,073,122 B1* | 7/2006 | Sedghi | 715/234 |
| 7,216,177 B1* | 5/2007 | Strong et al. | 709/230 |
| 7,219,305 B2* | 5/2007 | Jennings | 715/761 |
| 2001/0054048 A1* | 12/2001 | Kelsey | 707/513 |
| 2002/0091309 A1 | 7/2002 | Auer | |
| 2002/0143815 A1* | 10/2002 | Sather | 707/513 |
| 2002/0184070 A1* | 12/2002 | Chen et al. | 705/9 |
| 2003/0025728 A1* | 2/2003 | Ebbo et al. | 345/744 |
| 2003/0163597 A1* | 8/2003 | Hellman et al. | 709/316 |
| 2003/0167444 A1* | 9/2003 | Zorc | 715/513 |

OTHER PUBLICATIONS

PCT International Search Report, PCT/US00/31828, Medstory, Inc., International filing date: Nov. 16, 2000.

PCT International Search Report, PCT/US01/00378, Medstory, Inc., International filing date: Jan. 4, 2001.

PCT International Search Report, PCT/US01/47742, Medstory, Inc., International filing date: Dec. 7, 2001.

\* cited by examiner

METHOD, APPARATUS, AND SYSTEM FOR DATA MODELING AND PROCESSING

CROSS-REFERENCE TO RELATED APPLICATIONS

This application is a continuation of U.S. application Ser. No. 10/379,764, filed Mar. 4, 2003, now abandoned which claims the benefit of U.S. Provisional Application No. 60/361,746, filed Mar. 4, 2002, both of which are incorporated by reference herein.

BACKGROUND OF THE INVENTION

1. Field of the Invention

An embodiment of the invention relates generally to the field of information processing and to information modeling systems, and more particularly, relates to modeling a domain, interacting with the domain and manipulating the domain.

2. Description of the Related Art

Modern ontological systems are handicapped by inconsistent approaches to storing, searching, transmitting, and publishing data and/or services. These inconsistencies prevent modelers (e.g., the people or computer system responsible for creating the ontology) from effectively influencing the system without significant effort. For example, an ontology change may need to be reflected in a model, such as an XML Schema, as well as in any transmitted instances of the ontology such as in XML Documents. In addition, changes may also need to be reflected in the database storing the instances of models (in the case of a relational database management system (RDBMS), for example, tables may need to be modified, created, or deleted). Furthermore, object classes created for use in an object-orientated system may also need to be modified and recompiled.

Tools can significantly reduce the burden on the modeler by allowing for automatic generation of alternative forms of the models after changing an XML Schema or document type definition (DTD). However these tools in themselves are not sufficient for a robust ontology-based system that requires that such models (or instances of the models) be published, maintained, discovered, searched, transmitted or can trigger events.

SUMMARY OF THE INVENTION

A method to process a domain. The method includes modeling the domain with at least one domain model; generating support models for an ontological system to interact with and manipulate the at least one domain model; and using the support models to describe domain model states.

BRIEF DESCRIPTION OF THE DRAWINGS

The features of the present invention will be more fully understood by reference to the accompanying drawings, in which.

DETAILED DESCRIPTION OF THE PREFERRED EMBODIMENT

Figure 1:
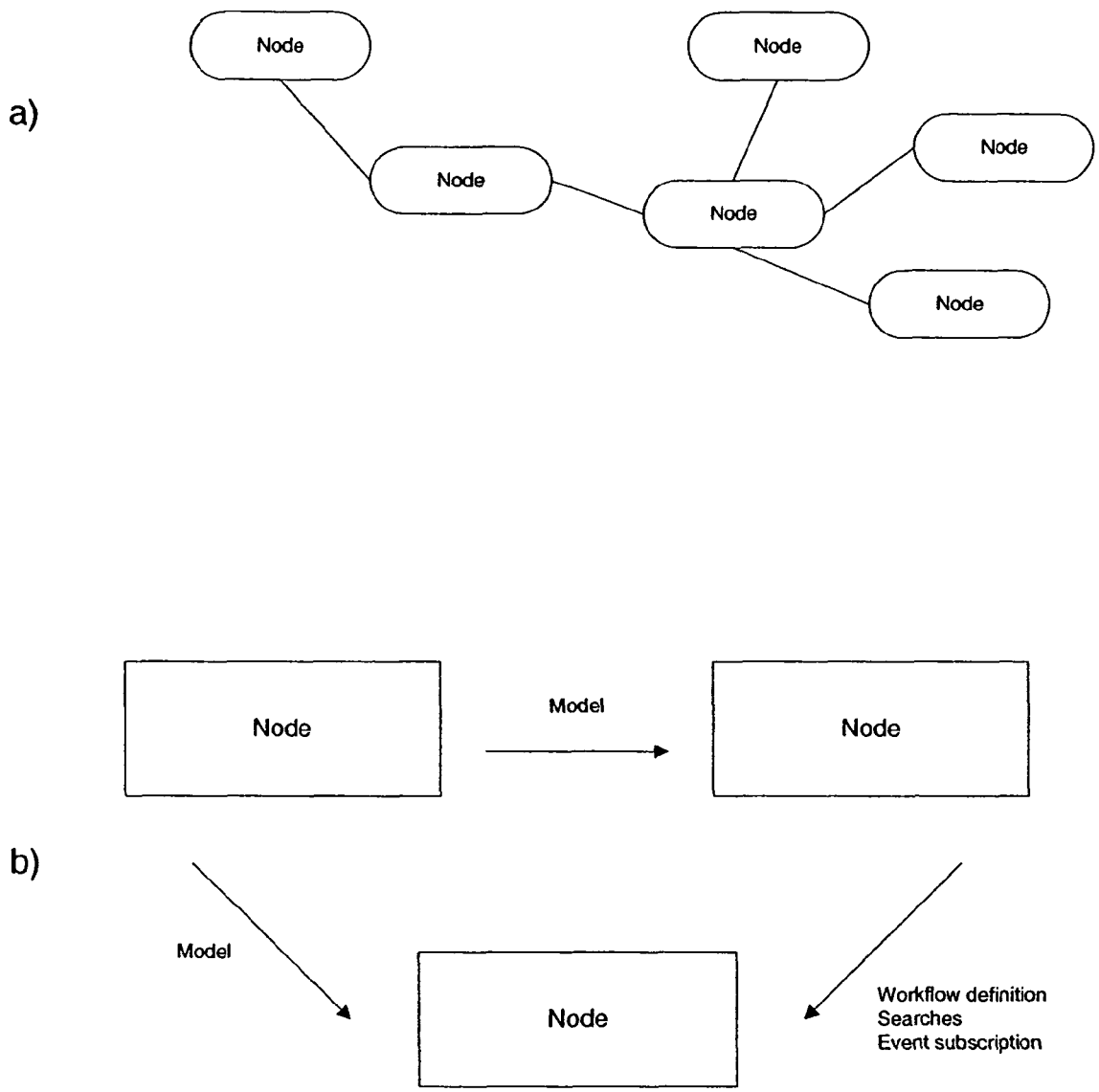
FIGS. 1a and 1b illustrate a system in accordance with one embodiment of the present invention.

According to one aspect of the present invention, an ontological modeling system is provided that allows for seamless integration of the ontology with various processes including but not limited to transmission, discovery, notification, searching, filtering and storing processes. The invention builds upon an ontology to allow expression of relationships between the ontology and allow for the description of various models that exist within the ontology. In one embodiment, a system is provided that allows for several processes including but not limited to ontology-based workflow, searching, and event subscription. Furthermore, the invention allows for definitions of workflow, searches and event subscription based on the models defined as being part of the modeling system.

To accomplish this integration of processes and the ontology, the present invention, in one embodiment, may be comprised of the following: (i) a set of tools capable of generating components, object classes and database tables using XML Schemas or DTDs as templates, and (ii) a set of services that utilize the components, object classes and tables generated by the tools.

In one embodiment of the invention, a human modeler creates one or more XML Schema by interacting with a computer using input and output devices. The set of tools then generates the various components such as Selector Schema, Java objects and database tables, etc. The system then utilizes these components for use with various services that may include storage of model instances, transmission of model instances, discovery of services, notification of events, and searching through stored instances.

As discussed in detail herein, the present invention provides a method, apparatus, system, and machine-readable medium for establishing a consistent infrastructure for data modeling and processing including publishing, searching, describing, filtering, processing, storing and notifying based on underlying ontological models which describes an exemplary domain. Model-based component generation is an important aspect concerning the performance and usability of the overall system. Following component generation, the various components can be used by the system for various purposes and/or functions. Various aspects of component usage are discussed in detail herein including data transmission and manipulation of models, data search on a repository of models, event subscription and workflow. In addition, indirect transfer of information using URLs within models is also discussed.

In one embodiment of the present invention, a system as described herein includes various components including component generation tools, components for transmission of models across systems, components for event subscription and notification, components for service publication and discovery, etc. In addition, the system may include other components such as searching components.

Often a system can work alone. However, systems may also interact and such systems can be configured to communicate to each other, as shown in FIG. 1a, where several systems or 'nodes' are configured to interact with each other.

FIG. 1b illustrates a platform according to the teachings of the present invention that enables a modeler to publish models which can be incorporated into a system and used by users not only to describe model instances but also to allow for various protocols or processes for users to search for models, subscribe to events, define workflow and other system processes.

Models

In one embodiment of the present invention, the models may be defined as XML Schema and can include such features as inheritance (from other XML Schema types) as well as other features defined in the XML Schema specification. (More information regarding XML Schema specification is available for reference at www.w3c.org.) Alternatively, with minor modifications, model definitions can be created using DTDs (Document Type Definitions) or can be defined as classes (such as Java classes) or database tables, and from these alternative representations XML Schema could then be generated.

Models, in one embodiment of the present invention, can be represented as complex types, according to the XML Schema specification. The complex types can be assembled using properties that are simple types defined by the XML Schema specification and/or other complex types (that are also created in accordance with the Schema specification). Additionally, complex types can be created from other types using inheritance as specified by the XML Schema specification.

In one embodiment, there are several specific models that are used by the system for various tasks, such as a workflow model, an event model and a service descriptor model. Two types of exemplary support models that are used for the system operations are discussed in more detail below, the Selector models and the Criterion models. These support models are used to describe exemplary domain models that may be passed around the system. In one embodiment, domain models may not be used explicitly by the system for basic system functionality but may be passed between systems or generated for use by particular services that reside on a given system.

Selector Schema

Selector Schemas are generated from the original Schema developed by the modeler. The Selector generator tool used in this implementation and is discussed further below in the Generation Tools section. The Selector Schemas are used by the system for a wide variety of functions, from searching a collection of models to service discovery to event subscription. Each Selector Schema allows selection criteria for a given object type to be defined.

For illustration purposes, naming conventions used in this system are the following: for a complex object defined as 'X', a Selector object created for that object is named as 'XSelector'. For example, for an object called Basketball, a Selector object call BasketballSelector would be defined. Other naming conventions of course can be used depending on the various applications and/or implementations of the present invention. In other applications or implementations, naming conventions may not be required.

For every simple property in the object being described, the Selector Schema allows selection criteria to be defined for that property using a Criterion object (discussed further below in the Criterion Schema section). For every complex property in the object being described, the Selector Schema may contain another Selector object corresponding to the complex property type in the original object. For example, following one naming convention, if an object had a property named 'ball' of complex type 'Basketball', the Selector Schema for that object would contain a property named 'ball' of complex type 'BasketballSelector'.

Criterion Schema

For every simple property in the object being described, the Selector Schema allows selection criteria to be defined for that property. This is done using a special type created for the system, called a Criterion type. This type allows for the definition of criteria for a simple property. For example, if a model contains an integer property called 'id', the Selector Schema allows for the definition of 'id>100' using a Criterion object. When applied in the context of a search of a collection of models, such as in a database, the Selector Schema in this case would allow the user to find all models of the type defined by the Selector that also had a 'id' property greater than the value '100'.

Model-Based Component Generation Tools

In one embodiment, there are three distinct component generation tools that are used to automatically generated components based on the model definitions created by the modeler.

Figure 2:
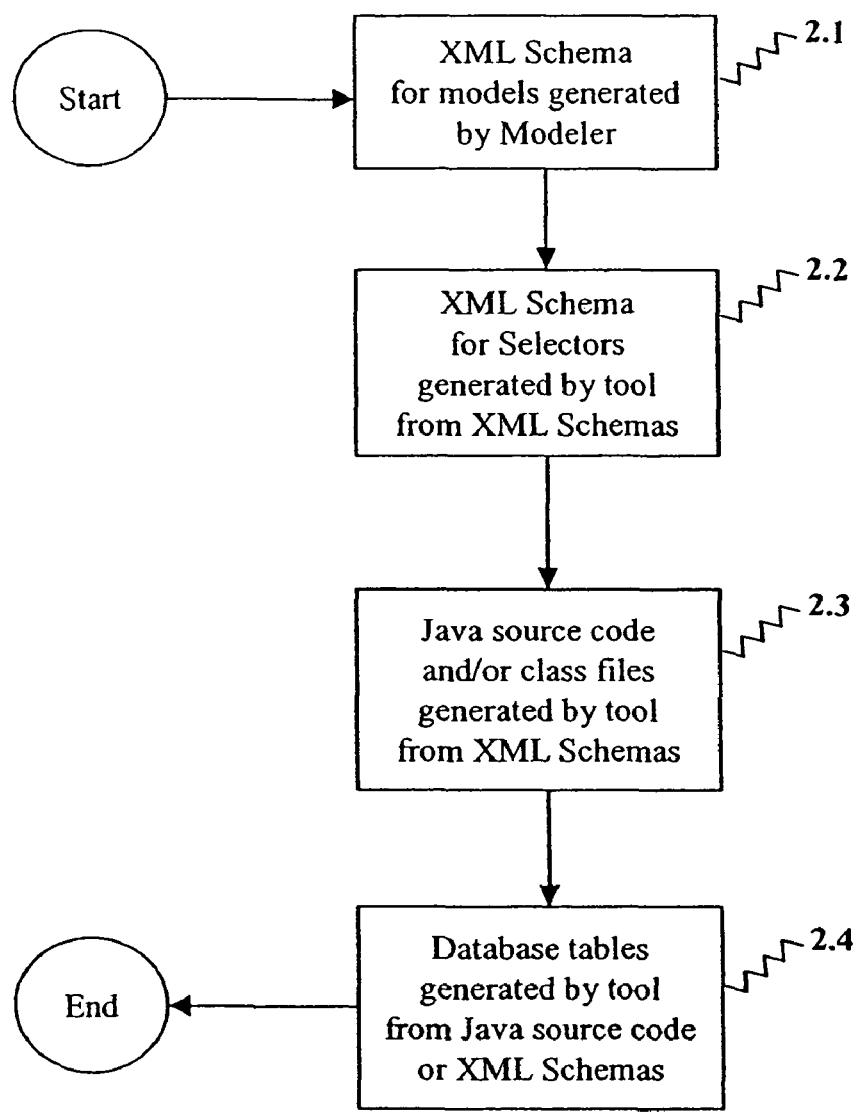
FIG. 2 is a flow chart of one embodiment of a method according to the teachings of the present invention.

FIG. 2 shows a flow diagram of a process for generating data models or objects in accordance with one embodiment of the present invention. The process can be performed by a series of tools or by a single tool comprised of these tools. Initially, the modeler generates schemas (e.g., XML Schemas) that represent objects for use by the system (block 2.1).

After the models have been created as one or more XML Schemas, the Schemas are used to create new XML Schema that act as Selectors in the system (block 2.2). The creation or generation of schemas for selectors are described in more detail below. The enhanced collection of XML Schemas is then used to generate source code such as Java source code and/or class files (or source code/classes for another object-orientated programming language could alternatively be created) that correspond to the objects represented in the XML Schema (block 2.3). Another tool uses the classes or source code generated in the previous tool to create database tables corresponding to the objects (block 2.4). Alternatively, the original XML Schema could be used to generate the database tables.

Generation Process

Figure 3:
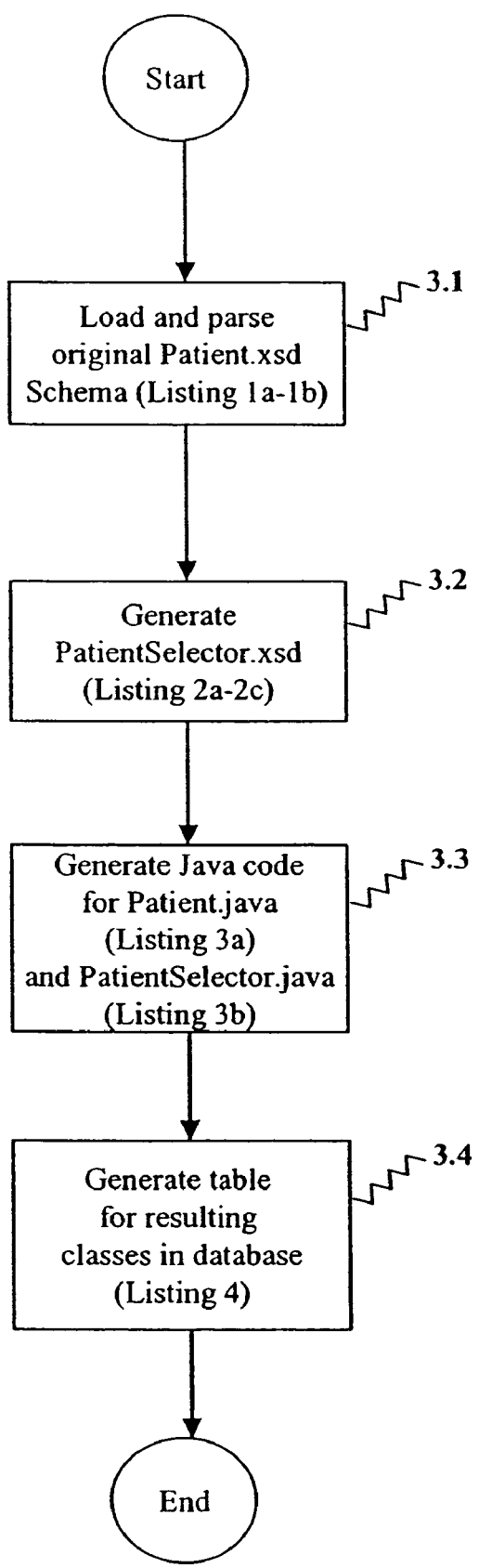
FIG. 3 is a flow chart of an exemplary process for generating data models/components in accordance with one embodiment of the present invention.

An example of a process for generating data models/components in one embodiment of the present invention is shown as Listings 1-3 and described in FIG. 3. Initially, the models to be used in the generation process are loaded and parsed by the generation tool (block 3.1) and then used by the Selector generation tool to generate Selector Schema corresponding to the original Schema (block 3.2). The original Schemas in this example are listed in Listing 1a-d. The generated Selector Schemas are shown as Listing 2a-2c. Following the generation of the selection Schemas, all Schemas are used by the code generation tool to create Java source code (block 3.3) that can then be compiled into Java class files. Selections of Java source code created by the code generation tool are shown as Listing 3a-3d.

The table generation tool then generates database tables for the types created (block 3.4). In one embodiment, this can be done by generating table creation SQL commands and executing them on an RDBMS such as Oracle. An example of a class that does this is shown as Listing 4.

Selector Generator

Figure 4:
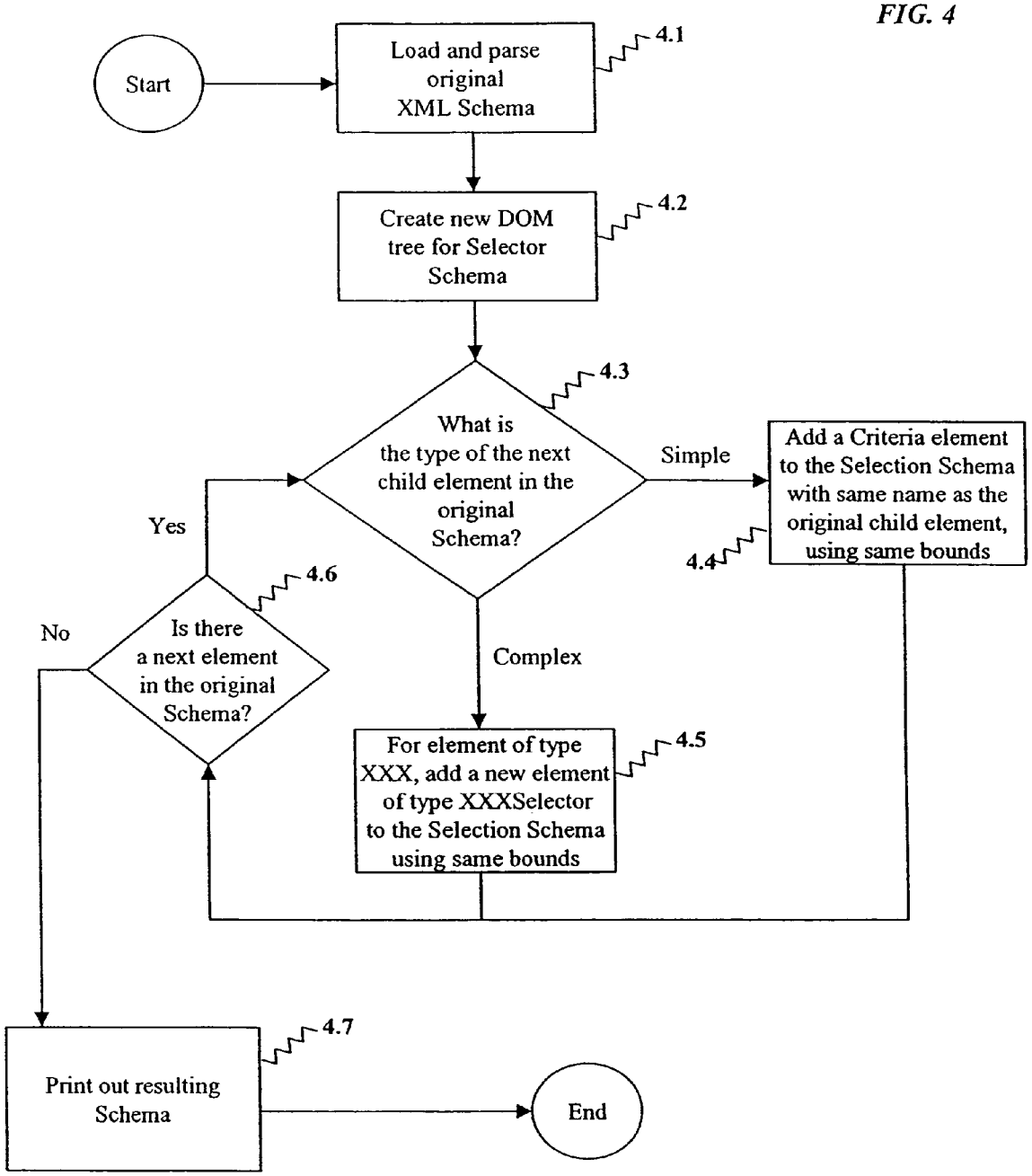
FIG. 4 is a flow chart of an exemplary process for generating selector schemas according to one embodiment of the present invention.

FIG. 4 shows a flow diagram of one embodiment of a process for generating selector schemas. Initially the generator tool loads and parses the original XML Schema into a document object model (DOM) object or another structure (block 4.1). In this example, it is assumed that there is one complex type (model) defined in the Schema. In alternative representations, there can be several complex types defined in the Schema, in which case the generator tool would iterate over each complex type defined in the Schema.

For the complex type defined in the Schema, a new DOM tree is created for the selection Schema that will correspond to the complex type (block 4.2). The generator then iterates through the properties of the complex type (block 4.3). If the next property is a simple type (block 4.4), then a Criterion object is added to the Selector object being created, with a name corresponding to the property name. The Criterion type is also added with the same upper bounds as the simple type, for example, if the property can occur once and only once, then the Criterion type for that property is allowed to be defined at most once. Note however, that all Criterion property types are optional, allowing for the system to use instances that do not necessarily define criteria for each property. Thus, the lower bound for all Criterion objects is zero.

If the next property type is complex (block 4.5), then a new element of the type corresponding to the Selector type for that complex type is added to the Selector DOM tree. For example, if a complex type "Basketball" is included as a property in the parent object, then a BasketballSelector" is included in the parent Selector type. As with simple types, the same upper bound is used for the property but a lower bound of zero is used.

If there are one or more other properties defined in the original complex type (block 4.6), then the same process is repeated with the next property. If not, then the assembled new type is printed out as a new Selector schema (block 4.7). The use of these Selector Schemas is discussed further below.

Class Generator

After loading an XML Schema, the code generator parses the elements in the complex type it is analyzing and creates properties in the Java code it is assembling that correspond to each child element in the complex type. For every property that is created, the code that is inserted for each property includes the property declaration (as a global property), and get/set methods for setting and getting the property.

Figure 5:
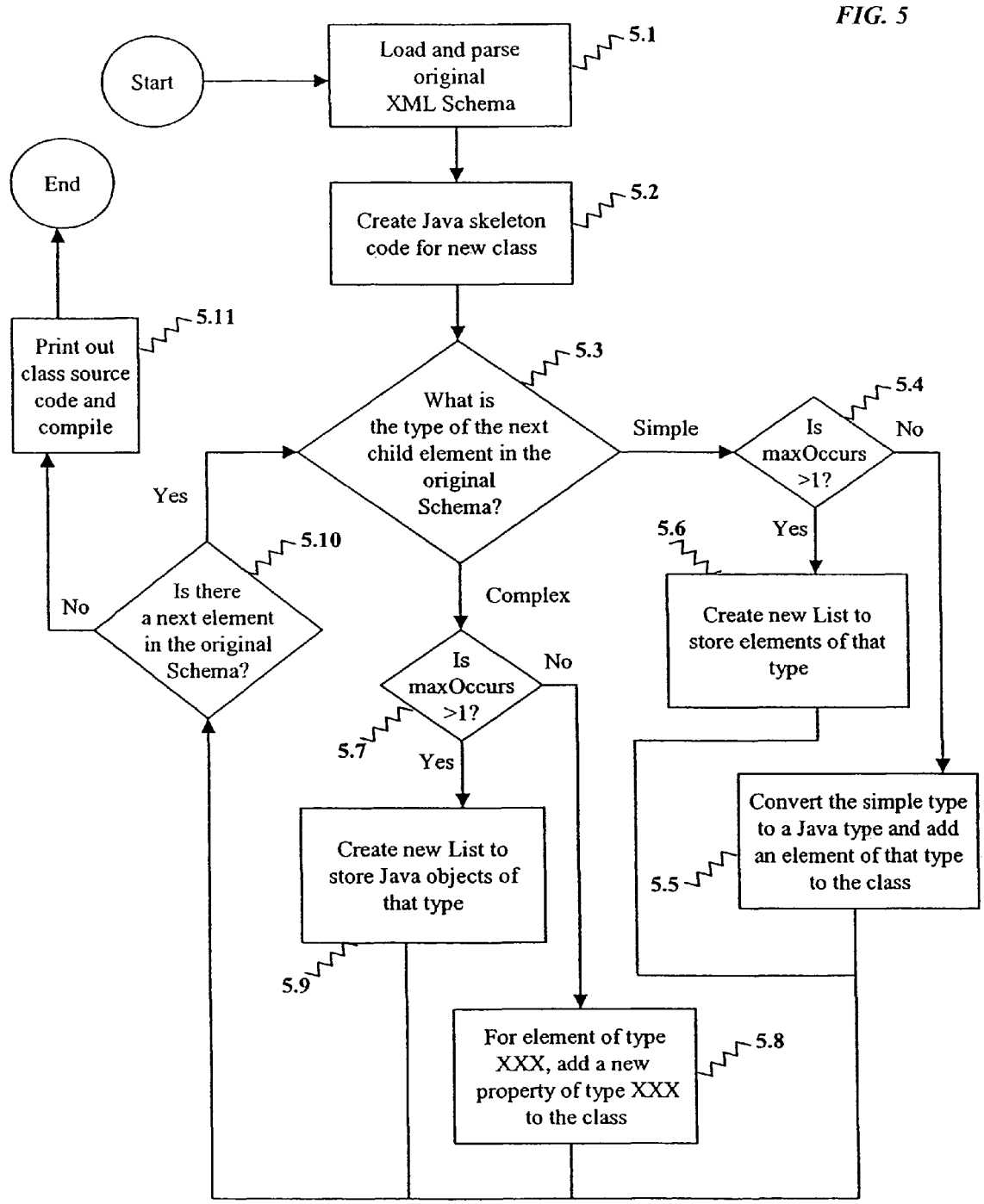
FIG. 5 is a flow chart of an exemplary process for generating classes from schemas.

FIG. 5 illustrates a flow diagram of one embodiment of a process for generating classes from schemas. Initially the generator tool loads and parses the original XML Schema into a DOM object or another structure (block 5.1). In this example, it is assumed that there is one complex type (model) defined in the Schema that will correspond to one Java class being created. In alternative representations, there could be several complex types defined in the Schema, in which case the generator tool would iterate over each complex type defined in the Schema generating several classes.

The generator may create one or more string buffers and load these buffers with skeleton code for the objects to be created (block 5.2). The generator then parses through each element in the complex type (block 5.3). If the type is a simple type, it determines whether the element can occur once or more than once (block 5.4). If the element can only occur once, the simple type is converted into a Java type and a property corresponding to the name of the element is added to the code buffer for the class (block 5.5). Alternatively, if the element can occur more than once, code for a container object (such as an Array or a List) is created (block 5.6) to hold all occurrences of the property in the Java class. In this example, List objects are used as the container objects.

If the next type is a complex type rather than a simple type, it is determined whether the element is allowed to occur once or more than once (block 5.7). If the element can occur only once, then a property of the Java type corresponding to the complex type of the element is added to the Java code (block 5.8). For example, under one naming convention, if the child element is called 'basketball' and is of type 'Basketball', then a property called 'basketball' of type 'Basketball' is added to the Java code, and it is assumed that the code for that object will exist on the system. In other implementations, mapping could exist to create alternative objects. Also in other implementations, the existence of object types could be verified or otherwise guaranteed. However, in this example, the class corresponding to that object would exist (perhaps created using the class generator with another XML Schema).

Alternatively, if it is a complex type that could occur more than once, a List type is added to the Java code under the property name corresponding to the name of the element (block 5.9), similar to the case of a simple property that is allowed to occur more than once. For example, if the child element is called 'basketballs' of type 'Basketball' and could contain zero to many 'Basketball' objects, then a List type is created called 'basketballs' to hold zero to many 'Basketball' objects.

The process is repeated for all child elements in the complex type (block 5.10), and then the code that has been created is printed out (block 5.11) and optionally is compiled. This process can also be done dynamically, that is, given a new XML object type with a new schema, the Java class for that type could be automatically generated and compiled for immediate use by the system.

The class generator is also capable of handling inheritance, such that an XML complex type that extends another complex type in an XML Schema will dictate to the generation tool that the new Java class is to be created as an extension of the parent class corresponding to the parent type in the XML Schema.

Table Generator

In one embodiment, objects are persisted or stored using an RDBMS. Alternatively, objects could be persisted or stored in an XML database, in an object database, or in a file system.

Figure 6:
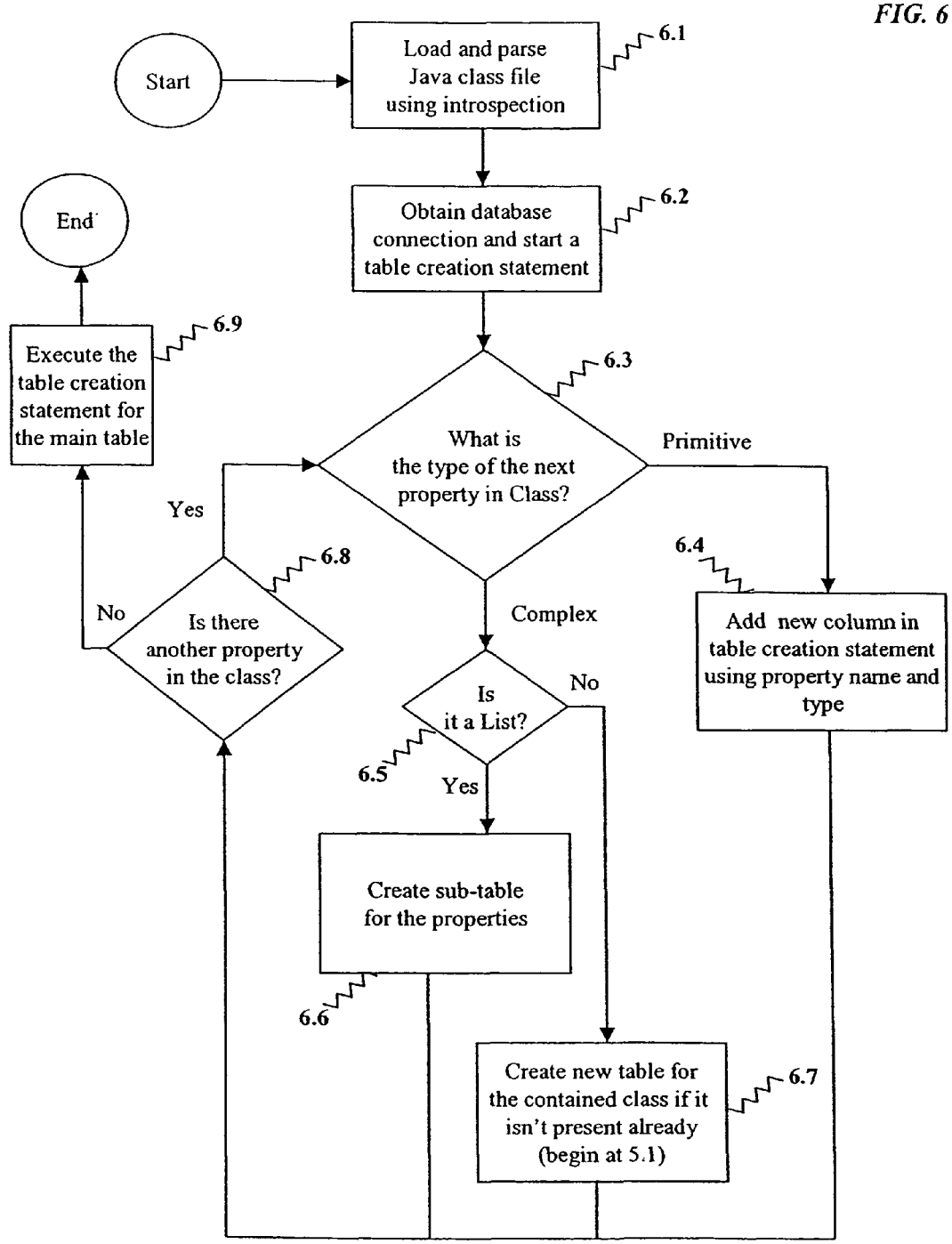
FIG. 6 is a flow chart of an exemplary process for generating database tables from object classes in accordance with one embodiment of the present invention.

FIG. 6 illustrates a flow diagram of one embodiment of a process for generating data base tables. Initially the generator tool loads a Java class (block 6.1). In one embodiment of the present invention, the table generator inspects the properties of class files and uses those properties to create tables. Java classes can perform this inspection on other Java classes (or even themselves) using 'reflection'. Alternatively, the table generator could utilize XML Schemas instead of Java class files. The generator also obtains a connection the database and begins creating an SQL table creation statement (block 6.2) for the main table. The generator then steps through each property using reflection and determines whether the property is primitive or complex (block 6.3). If the type is primitive, a new column is added to the table creation statement (block 6.4). If the type is complex, the generation tool checks to determine (using reflection) whether the property is of type List (block 6.5). If it is of type "List", a sub-table is created for the property (block 6.6). If it is not of type "List", a new table for the contained class is created if it isn't already present in the database (block 6.7), using the same method for the new class (starting from block 6.1), or it is assumed that the generation tool will be run with that class at a later time.

After all properties have been cycled through (block 6.8), the finished table creation statement for the original class is executed (block 6.9).

Table Mapping

In some cases it may be desirable to use an existing database with the system instead of generating new tables for the objects that will be used by the system. In such a case, it is unlikely that the existing tables will correspond to the tables that would be generated by the table generation tool discussed above. However, using a table mapping tool and an adapter for query translation it is possible to use pre-existing database tables with the system. Using a table mapping tool, it is possible to map fields of the database to the Java representation of the objects. However, these tools may not allow for searching using Selector objects as will be described below. Instead of reinventing a similar framework with similar mapping tools, one embodiment of the present invention may utilize a $3^{rd}$ party mapping application with a special adapter class that transforms a Selector-based query into a query in the query language of the $3^{rd}$ party tool. This query is then executed and the results are translated by the $3^{rd}$ party tool into the Java representation of the objects and returned for use by the system. Retrieval and storage of any objects may also be performed utilizing the $3^{rd}$ party's API. Support for additional mapping frameworks may also be added, or a customized platform that does not require a $3^{rd}$ parties mapping tools may also be developed for the system.

Data Transmission

Figure 7:
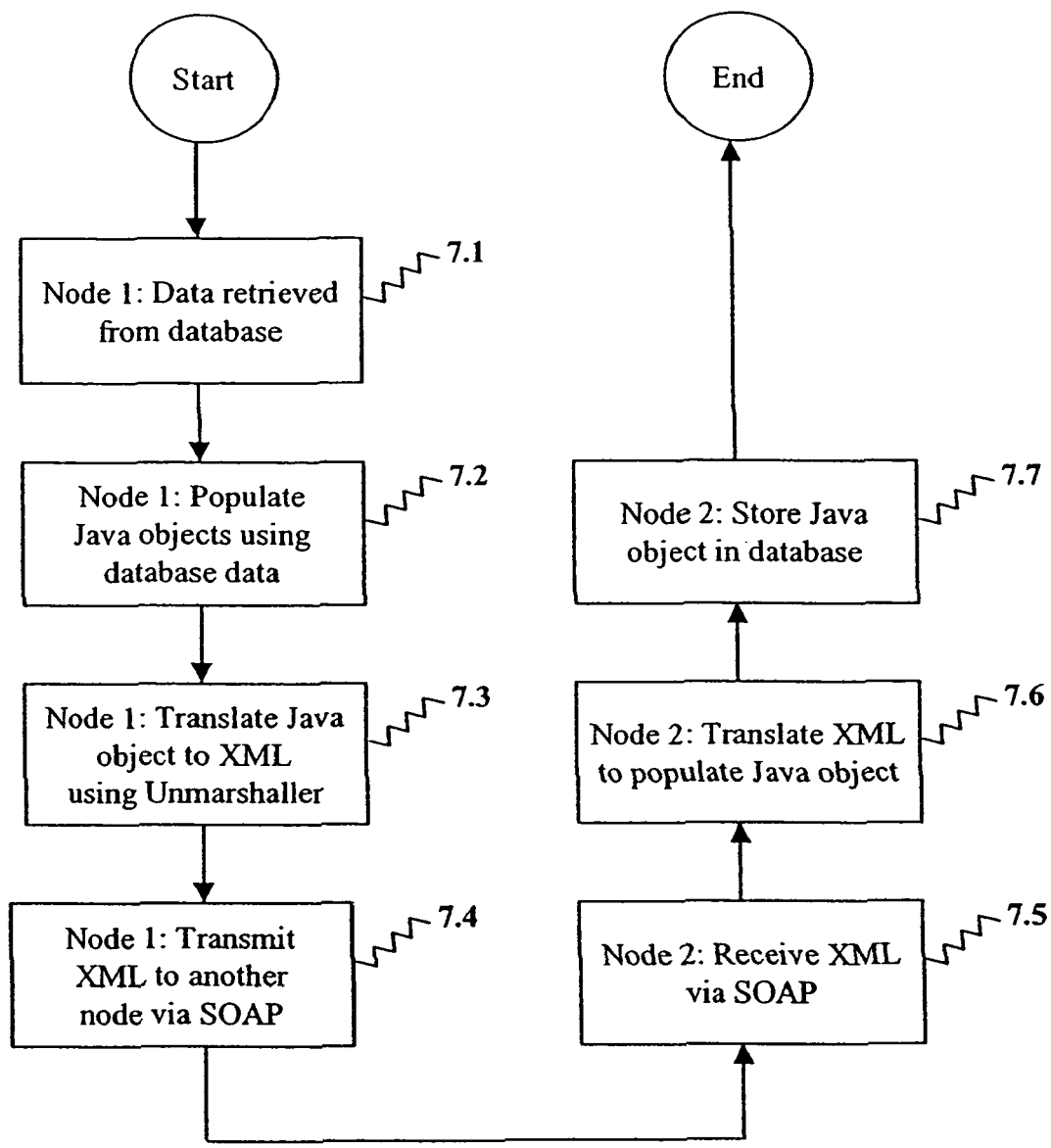
FIG. 7 is a flow chart of an exemplary process for data transmission according to one embodiment of the present invention.

The following description describe how two systems (referred to as Node 1 and Node 2 in this example) could interoperate by using common schema and also having access to similar generation tools as previously described. FIG. 7 is a flow diagram of an exemplary process for data transmission according to one embodiment of the present invention. Initially, Node 1 may retrieve one or more models from its database (block 7.1). Node 1 then uses the data retrieved to populate a Java object representing the model (block 7.2). Node 1 then translates the Java object to XML (block 7.3) and transmits the XML document to Node 2 using SOAP ("Simple Object Access Protocol")) or some other transmission protocol (block 7.4). The receiver of the XML document (Node 2, block 7.5) then translates the XML document to a Java object (block 7.6). The Java object could then be used by Node 2 to fulfill some request, or do something else such as store the Java object in its own database (block 7.7).

The various operations or functions described above require a variety of system functionality, including processes for turning an XML document into a Java object ("unmarshalling") with sample code shown as Listing 5, transforming a Java object into an XML document ("marshalling") with sample code for this process shown as Listing 6, retrieving information from the database and populating a Java object (sample code shown as Listing 7), and storing a Java object in the database (also shown in Listing 7).

Data Search

Figure 8:
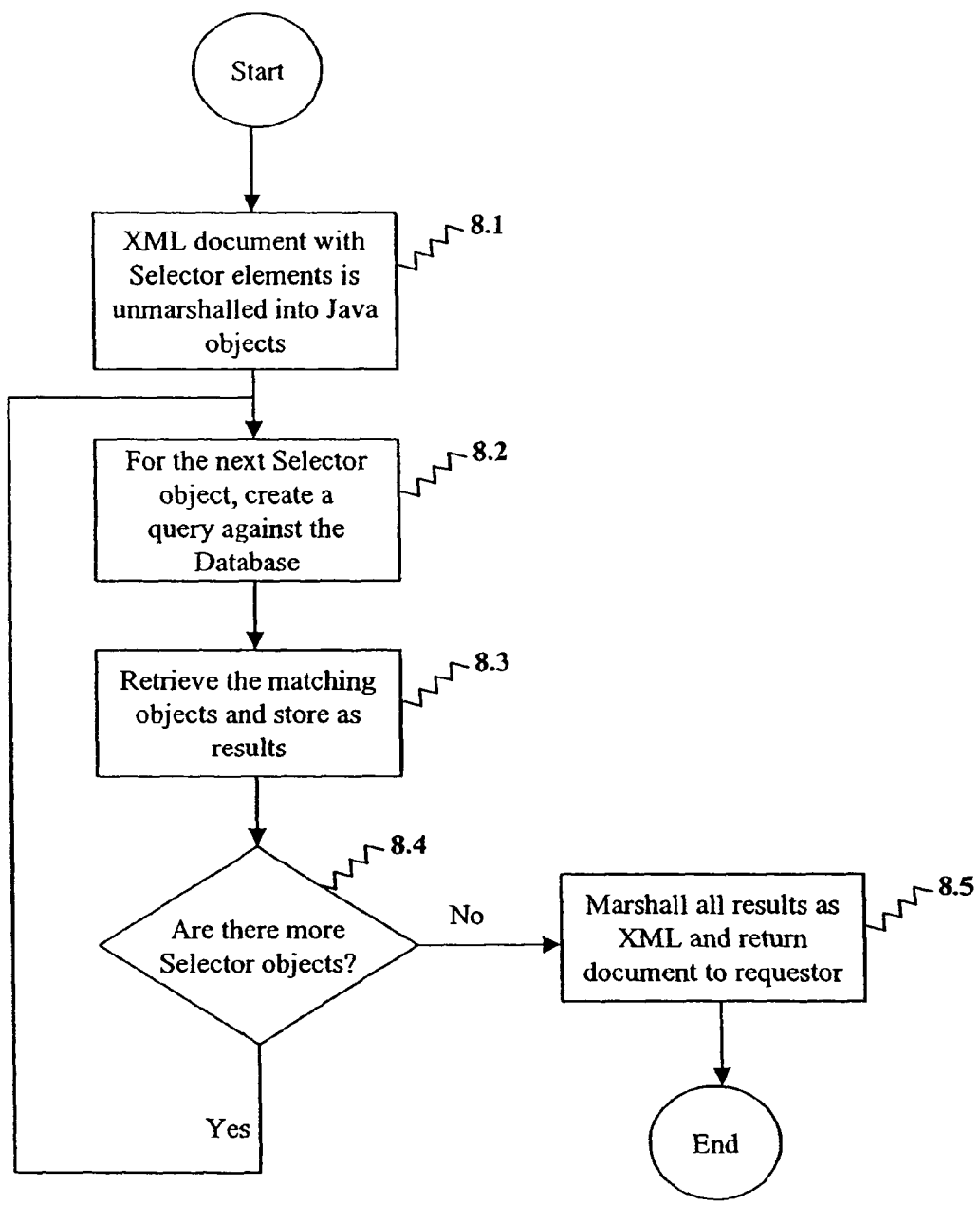
FIG. 8 is a flow chart of an exemplary search process in accordance with one embodiment of the present invention.

In general, since the tables and persistence mechanisms are defined by the system, it also allows for the definition of a general searching method in the tables. FIG. 8 shows a flow diagram of one embodiment of a searching process. A request may be generated internally or may be issued externally. The process shown in FIG. 8 can originate from an external request for a search, submitted using an XML document that contains one or more Selector elements. Initially, the system translates the XML document into Java objects (block 8.1). The system iterates through each of the top-level Selector objects (block 8.2) and uses the Selector object to query the database and retrieving the matching objects from the database (block 8.3). After iterating through each of the Selector objects (block 8.4), the retrieved objects are marshaled into XML and returned to the requester (block 8.5). The actual process the system goes through may involve other steps, such as a security check to determine whether the requesting node has access to the data.

In one embodiment of the present invention, which utilizes an RDBMS database, the system utilizes the Selector objects to create SQL statements that search the database. Example code used for creating search SQL statements in this implementation is shown as Listing 8. If a database was used that does not correspond to the standard implementation, custom code would need to be used to create the query and retrieval for that database.

In complex query systems a search method may allow for a set of criteria to be defined, either in an AND or OR type query. In one embodiment of the present invention a single Selector object can be used (perhaps with several imbedded Selector and/or Criterion objects) to define a set of criteria that are met for a successful match. Thus, a Selector object may only allow for multi-criteria matching of the AND-type. To accomplish OR-type matching, more than one Selector object can be used. For example, if the query in a human readable for is "return all basketballs that have color=red or size=small", then two BasketballSelector objects, one with a 'color=red' Criterion object is defined and a second BasketBallSelector object can be used to obtain the basketballs with a Criterion object with 'size=small' defined. The union of the queries then represents all matches that fit either criterion. If the query "return all basketballs that have color=red and size=small" is desired, then one BasketBallSelector object is used with two Criterion objects, one of 'color=red' and one of 'size=small'.

When pre-existing tables are utilized instead of tables generated by the table generation tool a different approach to searching is required. That approach is discussed further in an above section. It should be noted here that the method of utilizing Selector objects for querying databases is superior in many respects to the standard object query systems developed for querying databases. A Selector object query can be transmitted between systems (since it can be represented as an XML document according to its XML Schema) and Selector objects can be reused across many situations required for a robust network of systems such as event subscription and service selection, which are both discussed further below.

Event Subscription

Events in the context discussed here may include an object being received by a system for processing, or an object being sent out to another system, or an object being created by the system, or an object being deleted or modified by the system. There are other possible events that could be defined.

Selector objects can be used not only as a method of describing a search, but they can also be used to describe what events a system or user wishes to subscribe to. For instance, a system may wish to be notified every time a certain object is added to another system, or every time a particular object that fits certain constraints is added to or reaches another system. As an example, a system could subscribe to be notified when new objects are inserted into another system, and could use a "BasketballSelector" with a Criterion object for the "color" property, defining the object to be "purple". The system that the subscription is issued to would then notify the subscribing system whenever a "Basketball" object of "color=purple" was added to the system.

Figure 9:
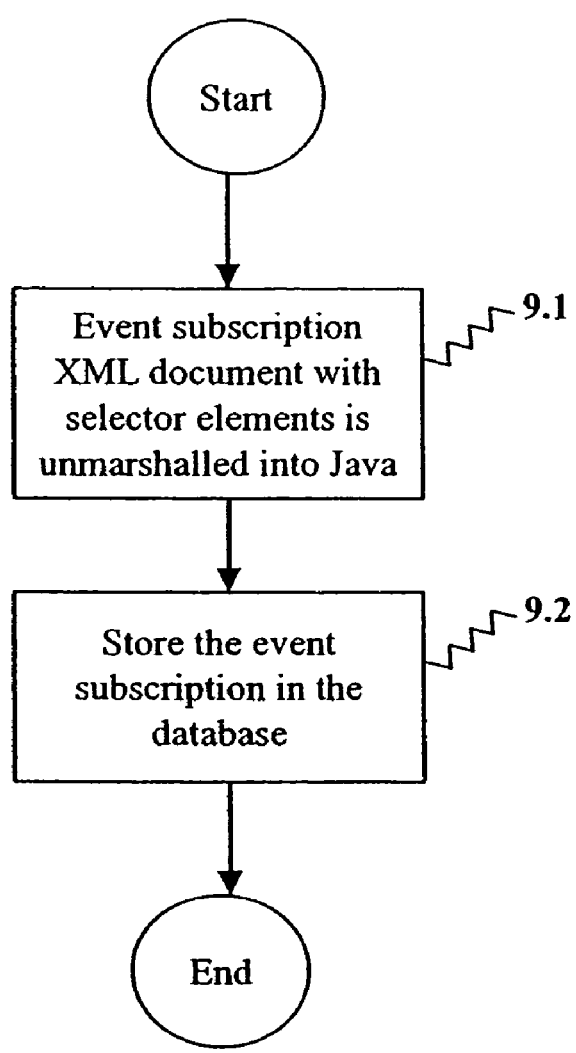
FIG. 9 is a flow chart of an exemplary process for event subscription process in accordance with one embodiment of the present invention.

FIG. 9 shows a flow diagram of an exemplary process for event subscription. Two separate systems (Node 1 and Node 2) are assumed in this example, although it is possible for a system to subscribe to its own events. Node 1 sends a subscription document (in XML) to Node 2 (block 9.1). This document contains details about what events are to be subscribed to, including one or more Selector elements in the document that defines selection criteria. The receiving system then translates the event subscription document into objects and stores the objects in its database (block 9.2) using the methods/processes that are described herein.

Figure 10:
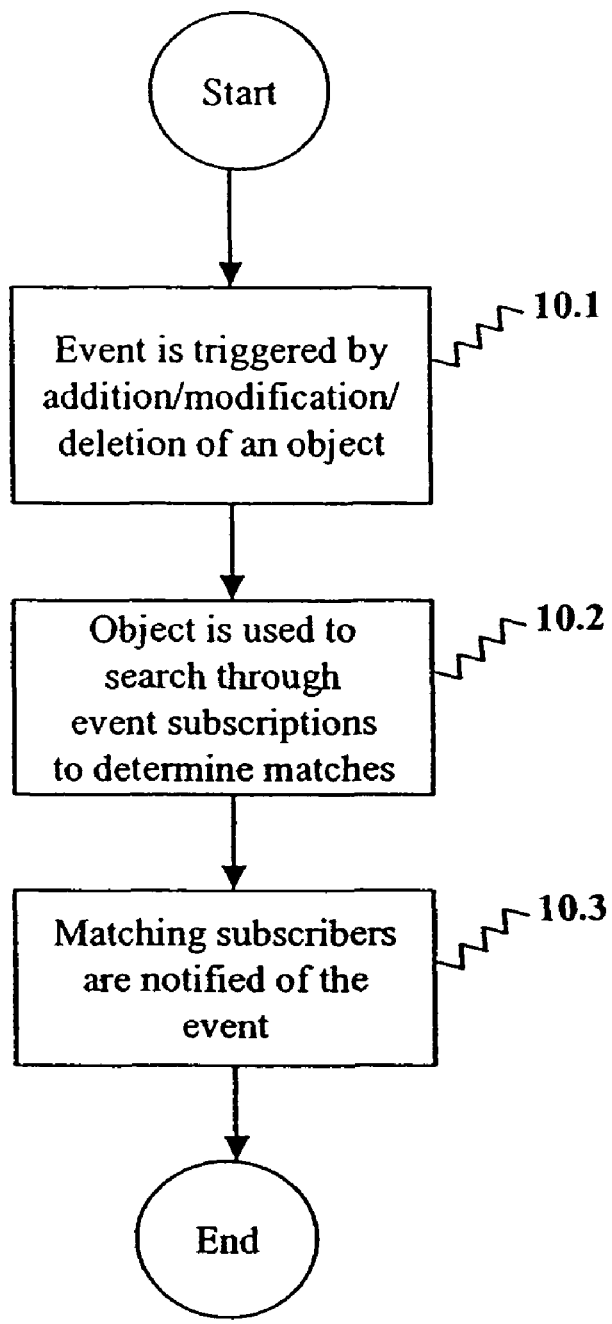
FIG. 10 is a flow chart of an exemplary process for event notification in accordance with one embodiment of the present invention.

FIG. 10 illustrates a flow diagram of one embodiment of an event notification process. When an event occurs in Node 2 (block 10.1), the object that is being deleted/modified/created is used to determine which event subscriptions are valid for the event and what systems should be notified. This process involves matching the object(s) involved in the event against the database of Selector objects to determine which Selector objects match the object(s) in question (block 10.2). The subscribers that do have subscription that match the events are then notified of the event (block 10.3) using an XML document that under one embodiment of the present invention also contains the object(s) involved in the event. For example, if a new object is generated, that object is passed as part of the notification document.

Workflow

Figure 11:
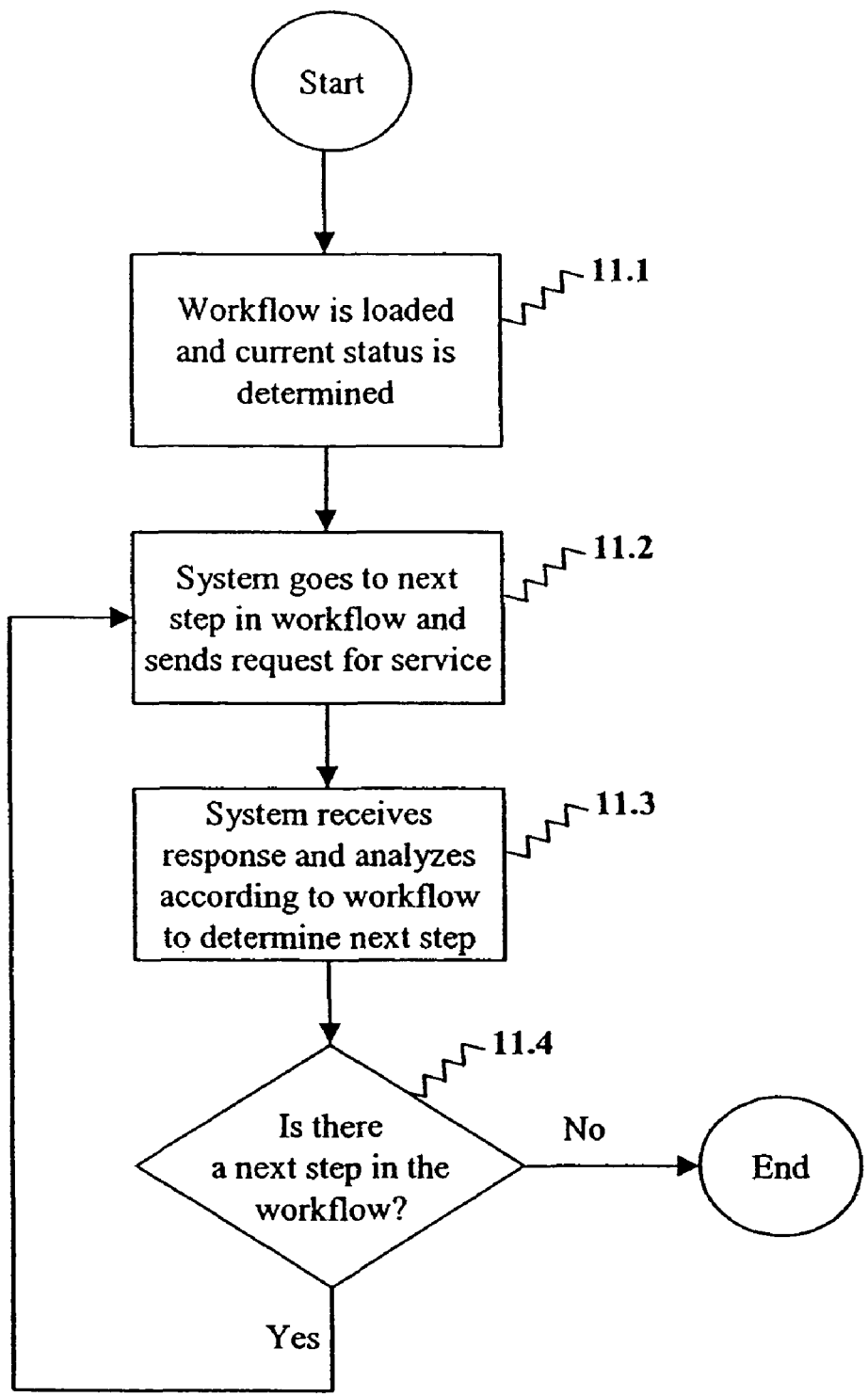
FIG. 11 is a flow chart of an exemplary workflow process in accordance with one embodiment of the present invention.

Selector objects can also be used to determine workflow. FIG. 11 shows a flow diagram of an exemplary workflow process in accordance with one embodiment of the present invention. FIG. 11 depicts how a system can use Selector objects to determine workflow for a document. An example workflow document is shown as Listing 9. The workflow example shown uses several Selector objects to describe the steps of the workflow depending upon the contents of the document. Because previous steps place their results in the document (as objects corresponding to schema definitions defined for the ontology), the workflow can describe conditional workflow dependant upon the results of prior steps in the workflow.

First, the system loads the workflow section of the document (block 11.1) and determines the next operation in the workflow, sending service requests to the appropriate services (local and/or remote) if necessary (block 11.2). The system then receives the results from the services and determines the next operation in the workflow (block 11.3). If there is no next operation according to the workflow (block 11.4) then the processing of the document ends. Otherwise, the next operation in processing is initiated (block 11.5).

In one embodiment of the invention, the system utilizes a workflow document as shown as Listing 9, that contains a 'step' parameter and also a section that holds Selector objects. In one embodiment, the system iterates through each of the Workflow objects according to their step parameter. Parallel processing occurs when two Workflow objects have the same step parameters. For example, suppose there existed a document with three Workflow objects, include two objects that had "step=1" and one Workflow object with "step=2". In this scenario, the system would process the two objects that had the "step=1" defined, sending requests to services described in those Workflow objects. After all services called in this process returned with results, the system would then continue and perform the service requests for the Workflow object with "step=2". This system can also be expanded upon as needed to achieve more advanced workflow processes.

In one embodiment, each Workflow object contains a "requirements" object that holds zero-to-many Selector objects. In one embodiment, the document contains objects that meet all of the requirements specified using the Selector objects. The matching algorithm used for determining matched events (described above, in which matched Events are determined by the Selector objects of the Events matching the objects in the document) can be reused to determine whether the document contains objects that match the Selector objects. In one embodiment, the system accomplishes 'or' scenarios by having multiple Workflow objects with the same step parameter that have different Selector objects for one or the other case described by the 'or' operation. This system can also be expanded to achieve more advanced workflow processes.

In one embodiment, the absence of Selector objects in the requirements section of the Workflow instructs the system to execute the services in that step regardless of the contents of the object.

Remote Data Retrieval

In addition to a system that can pass actual data in models between nodes, the system is capable of passing models that might not contain all data concerning a model, but instead contain a reference to the model or, in the case of certain models that have standard annotations, a default reference to additional model information can be established.

Figure 12:
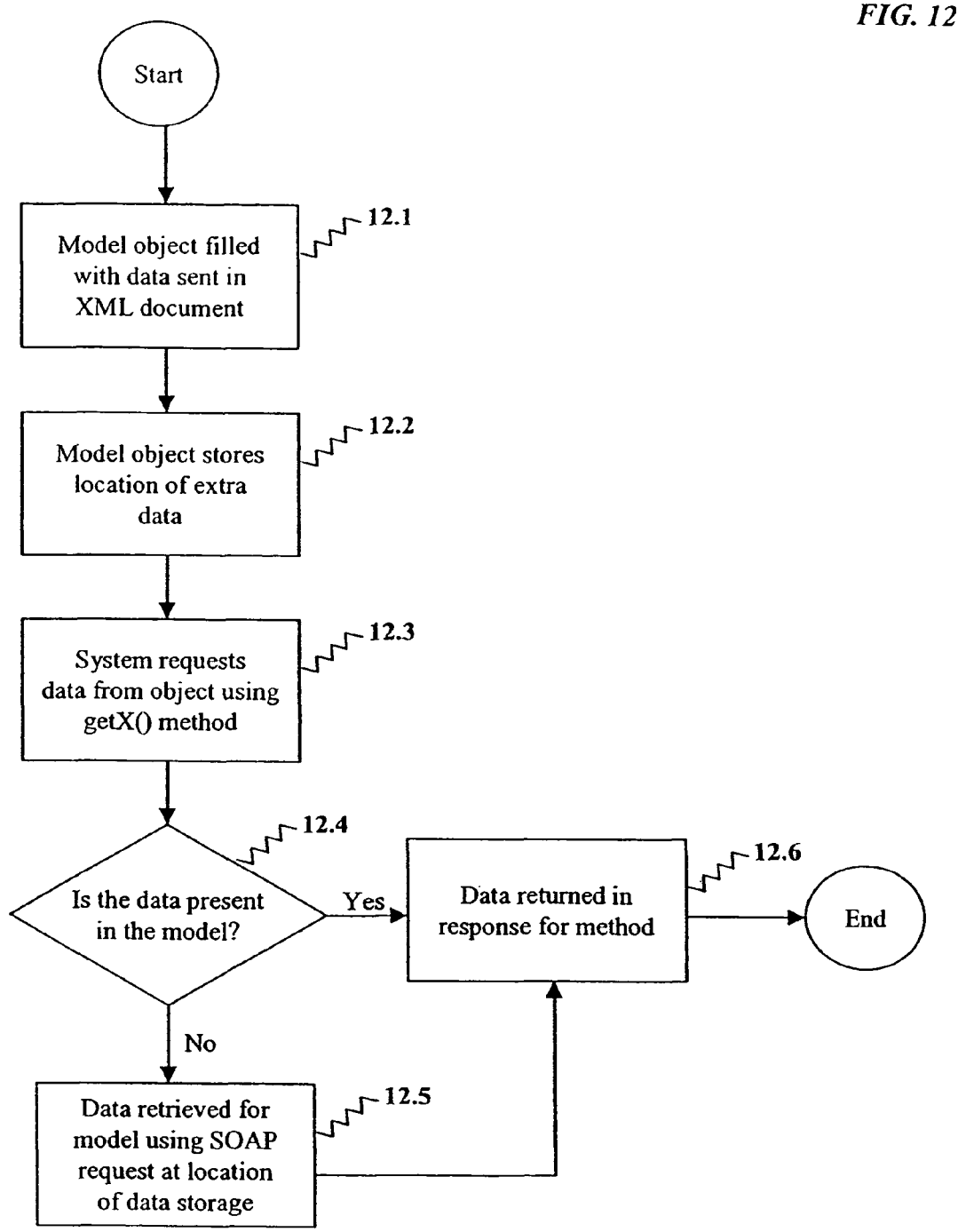
FIG. 12 is a flow chart of an exemplary process for data retrieval in accordance with one embodiment of the present invention.
Figure 13:
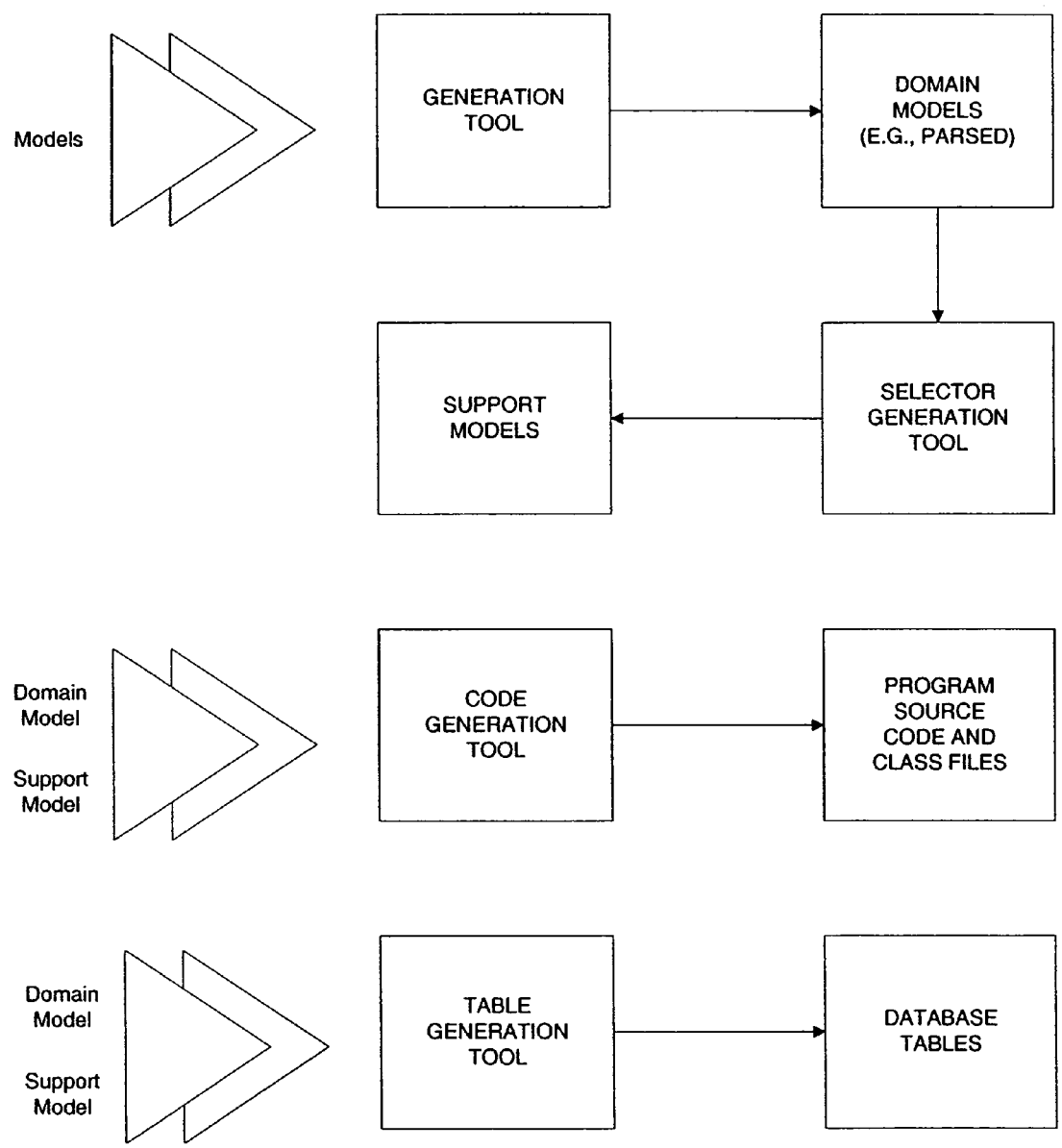
FIG. 13 is a block diagram illustrating a system to process a domain.

FIG. 12 shows a flow diagram of one embodiment of an exemplary process for remote data retrieval. Initially, an object might be passed to another system without certain attributes (even non-optional ones) described. A model object could be sent as an XML document (block 12.1) potentially with as little as one attribute, a unique identifier, sent in the object. Either included in the model object is a service location (block 12.2) that can be used to retrieve other attributes of the object, or in the case of agreed upon object models, the location might be a default location that the receiving system has knowledge of.

The receiving system can use this partially filled object normally, with method calls such as 'getx( )' for property 'X' (block 12.3). The system then determines if that property is available in the object (block 12.4). If that property is not in the object, it can be retrieved automatically by the system using the location specified in the object or the default location (block 12.5). This request is made in one embodiment of the present invention using a SOAP request that specifies the object's uniquely identifying property. If the data is already included in the object or once that information is retrieved and used to populate the object, then the data is then returned as a response to the 'getx( )' method call (block 12.6).

The data is returned from a remote query is a partially populated model in XML and is turned into a Java object and then integrated into the existing Java object. In one embodiment of the present invention, existing data in the existing object is not overwritten by data retrieved from this process. This process of foreign retrieval might retrieve not only the data requested but also additional data with additional properties, such that only one request is necessary to retrieve all supplemental information.

Alternative but Equivalent Processes

Although an embodiment of the present invention has been shown and described in some detail, along with certain variants of the invention, many other varied embodiments that incorporate the teachings of the present invention may be constructed by those skilled in the art of the invention. Accordingly, the present invention is not intended to be limited to the specific form described herein, but it is intended that alternatives, modifications, and equivalents of the invention or steps of the invention should also be included, as is reasonable within the spirit and scope of the invention.

Trivial alterations of the described invention include allowing the modeling process to be completed by algorithms or other processes acting to generate models. Another alteration would allow for 'dynamic' systems that generate components handling new XML document types at run-time (as opposed to design-time). Another alteration would allow the modeler to initially model their objects using classes or database tables (as opposed to XML Schema or DTDs) and having the generation tools construct other needed components from those different starting components, such that the generated system was similar to the system generated using XML Schema as the initial design templates.

In various embodiments the components, nodes, tools, systems and generators described herein may take the form of a machine.

Computer System

Figure 14:
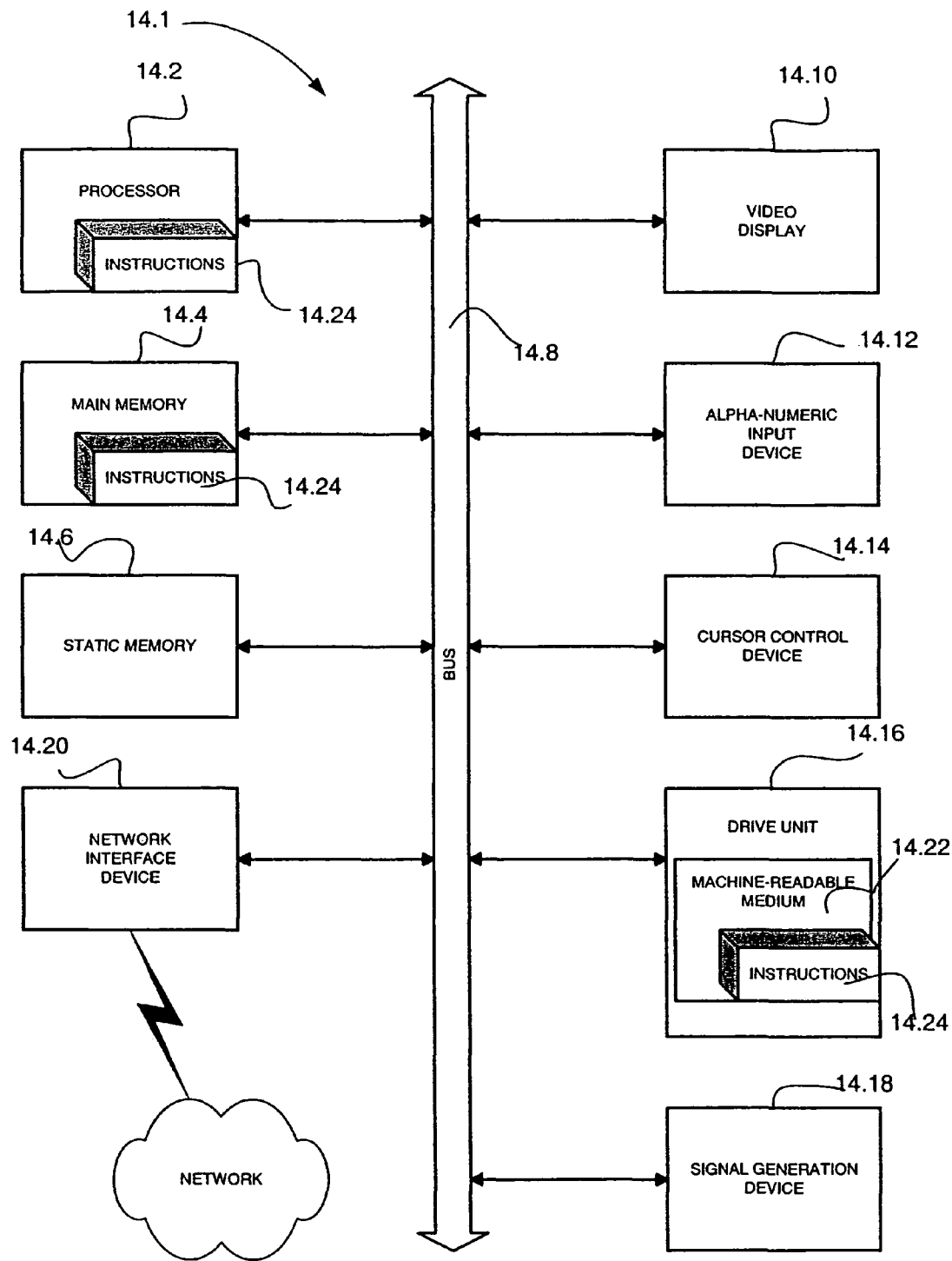
FIG. 14 shows a diagrammatic representation of an exemplary machine.

FIG. 14 shows a diagrammatic representation of the machine in the exemplary form of a computer system 14.1 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 14.1 includes a processor 14.2 (e.g., a central processing unit (CPU) a graphics processing unit (GPU) or both), a main memory 14.4 and a static memory 14.6, which communicate with each other via a bus 14.8. The computer system 14.1 may further include a video display unit 14.10 (e.g., a liquid crystal display (LCD) or a cathode ray tube (CRT)). The computer system 14.1 also includes an alpha-numeric input device 14.12 (e.g., a keyboard), a cursor control device 14.14 (e.g., a mouse), a disk drive unit 14.16, a signal generation device 14.18 (e.g., a speaker) and a network interface device 14.20.

The disk drive unit 14.16 includes a machine-readable medium 14.22 on which is stored one or more sets of instructions (e.g., software 14.24) embodying any one or more of the methodologies or functions described herein. The software 14.24 may also reside, completely or at least partially, within the main memory 14.4 and/or within the processor 14.2 during execution thereof by the computer system 14.1, the main memory 14.4 and the processor 14.2 also constituting machine-readable media.

The software 14.24 may further be transmitted or received over a network via the network interface device 14.20.

While the machine-readable medium 14.22 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

Thus, a method and a system to process a domain has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to model a domain, the method including:
    employing a processor to execute computer executable instructions stored on a computer readable storage medium to implement the following acts:
        modeling the domain with at least one domain model, wherein the domain is modeled using at least one of an XML Schema, a document type definition (DTD), an object produced for an object oriented language, or a relational table included in a relational database management system (RDBMS), and wherein the at least one domain model is a data schema comprised of a plurality of data objects that represent the domain, each data object is one of a simple type or complex type;
        generating support models for an ontological system to interact with and manipulate the at least one domain model, wherein at least one support model is a selector schema, the selector schema includes a selector object for each complex data object of the data schema and includes a criterion object for each simple data object, a criterion object defines selection criteria for an associated data object, a selector object is comprised of one or more criterion objects;
        triggering a step in a workflow, wherein the workflow includes at least one workflow object, the step corresponding to a workflow object, the at least one workflow object includes at least one selector object associated with the step, the ontological system employs the at least one selector object to trigger the step corresponding to the workflow object; and
        using the support models to describe domain model states.

2. The method of claim 1, further includes modeling the domain by:
    generating programming source code based on the data schema and selector schema; and selectively generating database tables based on the data schema and selector schema.

3. The method of claim 2, wherein generating the selector schema includes:
parsing the data schema;
for each property of a respective complex data type, determining whether the respective property is a simple property type or a complex property type; and
for each respective property that is a simple property type, adding a criterion object to the corresponding selector object of the selector schema.

4. The method of claim 3, wherein generating the selector schema includes:
parsing the data schema into a document object model (DOM), the data schema including a complex type property; and
creating a DOM tree for the selector schema which corresponds to the complex type property.

5. The method of claim 4, further includes:
for each respective property type that is complex, adding a new selector object to the selector schema corresponding to the respective complex type property.

6. The method of claim 5, wherein generating programming source code includes:
parsing each property contained in a complex type of the data schema; and
for each property contained in the complex type, creating a set of corresponding properties according to specifications of a first programming language.

7. The method of claim 6, further includes:
generating data object classes based on the data schema.

8. The method of claim 7, wherein the data object classes are Java classes.

9. The method of claim 7, wherein generating data object classes includes:
parsing the data schema;
creating a buffer for a data object class to be generated for the data schema;
loading a template code for the data object class to be created into the buffer;
for each property contained in a complex type of the data schema, determining whether the property is simple type or complex type;
for each property that is simple type, determining whether the property can occur once or more than once; and
for each property that can occur only once, converting the type of the property into a Java type and adding the Java type with a name corresponding to the name of the property to the buffer.

10. The method of claim 1, further includes using domain models with support models to remotely link domain models in a distributed ontological system.

11. The method of claim 1, wherein processing the at least one domain model with an ontological system includes generating domain and support models in at least one alternate format.

12. The method of claim 1, wherein the at least one support model is utilized to perform a search identifying a set of domain models which match a search criteria.

13. The method of claim 1, wherein the at least one support model is processed as a domain model by another support model.

14. The method of claim 1, wherein the ontological system notifies at least one of another ontological system or a user located at another ontological system upon occurrence of at least one of a condition or a state described by a plurality of support models.

15. The method of claim 1, wherein the workflow comprises a plurality of steps, each step has an associated selector object.

16. The method of claim 1, wherein the at least one domain model is utilized by at least one of a distributed ontological system or a non-distributed ontological system.

17. A system to model a domain, the system including:
a memory having computer executable components stored thereon; and
a processor communicatively coupled to the memory, the processor configured to execute the computer executable components, the computer executable components comprising:
a generation component configured to model the domain by generating domain models in the form of data schemas corresponding to data objects that represent the domain, wherein each data object is one of a simple type or a complex type, and wherein the generation component is configured to model the domain using at least one of an XML Schema, a document type definition (DTD), an object produced for an object oriented language, or a relational table included in a relational database management system (RDBMS);
a selector generation component configured to generate a selector schema for a corresponding data schema, the selector schema includes a criterion object for a simple data object in the corresponding data schema and includes a selector object for a complex data object in the corresponding data schema, the selector object includes one or more criterion objects, at least one of the one or more criterion object define selection criteria for the simple data object corresponding to the criterion object, wherein the selector generation component is further configured to trigger a step in a workflow that includes at least one workflow object corresponding to the step, the at least one workflow object includes at least one corresponding selector object configured to trigger the step;
a code generation component configured to generate programming source code based on the selector schema and the corresponding data schema; and
a table generation component configured to generate database tables based on the selector schema and the corresponding data schema.

18. A computer-readable storage medium to model a domain, the computer-readable storage medium including:
computer-readable instructions, the computer-readable instructions including instructions for causing at least one processor to perform the following acts:
generating domain models in the form of data schemas corresponding to data objects that represent the domain, wherein each data object is one of a simple type or a complex type, and wherein the domain models are modeled using at least one of an XML Schema, a document type definition (DTD), an object produced for an object oriented language, or a relational table included in a relational database management system (RDBMS);
generating a selector schema for a corresponding data schema, the selector schema includes a criterion object for a simple data object in the corresponding data schema and includes a selector object for a complex data object in the corresponding data schema, each the selector object includes one or more criterion objects, at least one of the one or more criterion object define selection criteria for the simple data object corresponding to the criterion object;

triggering a step in a workflow that includes at least one workflow object corresponding to the step, the at least one workflow object includes at least one corresponding selector object configured to trigger the step;
generating programming source code based on the selector schema and the corresponding data schema; and
generating database tables based on the selector schema and the corresponding data schema.

19. A machine readable storage medium storing a set of instructions that, when executed by the machine, cause the machine to:
model the domain with at least one domain model, wherein the at least one domain model is a data schema comprised of a plurality of data objects that represent the domain, each data object is one of a simple type or complex type, and wherein the domain is modeled using at least one of an XML Schema, a document type definition (DTD), an object produced for an object oriented language, or a relational table included in a relational database management system (RDBMS);
generate support models for an ontological system to interact with and manipulate the domain models, wherein at least one model is a selector schema, the selector schema includes a selector object for a corresponding complex data object of the data schema and includes a criterion object for a corresponding simple data object, wherein the criterion object defines selection criteria for an associated data object, and wherein the selector object is comprised of one or more criterion objects;
trigger a step in a workflow that includes at least one workflow object corresponding to the step, the at least one workflow object includes at least one corresponding selector object configured to trigger the step; and
use the support models to describe domain model states.

* * * * *